(12) United States Patent
Koyuncu et al.

(10) Patent No.: US 10,740,494 B2
(45) Date of Patent: Aug. 11, 2020

(54) CENTRAL AND DELEGATE SECURITY PROCESSORS FOR A COMPUTING DEVICE

(71) Applicant: Google LLC, Mountain View, CA (US)

(72) Inventors: Osman Koyuncu, San Diego, CA (US); William A. Drewry, Nashville, TN (US); Xiaowen Xin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 159 days.

(21) Appl. No.: 15/697,059

(22) Filed: Sep. 6, 2017

(65) Prior Publication Data

US 2019/0073491 A1    Mar. 7, 2019

(51) Int. Cl.
*G06F 12/14*      (2006.01)
*H04L 9/32*       (2006.01)
(Continued)

(52) U.S. Cl.
CPC .............. *G06F 21/70* (2013.01); *G06F 21/31* (2013.01); *G06F 21/552* (2013.01); *G06F 21/81* (2013.01);
(Continued)

(58) Field of Classification Search
CPC ........ G06F 21/31; G06F 21/552; G06F 21/70; G06F 21/81; G06F 21/83; G06F 21/84;
(Continued)

(56) References Cited

U.S. PATENT DOCUMENTS 8,307,416 B2 * 11/2012 Conti .................. G06F 12/1483
                                                    711/100
8,892,403 B1 * 11/2014 Le Grand ............. G01D 9/005
                                                    702/187

(Continued)

FOREIGN PATENT DOCUMENTS

CN          1695163        11/2005
CN         106330580        1/2017
(Continued)

OTHER PUBLICATIONS

"International Search Report and Written Opinion", PCT Application No. PCT/US2018/048561, dated Nov. 15, 2018, 15 pages.

(Continued)

*Primary Examiner* — Michael Simitoski
(74) *Attorney, Agent, or Firm* — Colby Nipper PLLC (57) ABSTRACT

The present disclosure describes use of two security processors for a mobile device. In some aspects, a first security processor device embodied in a security component of an apparatus receives a user input via an input device and transmits a security condition signal to a second security processor device embodied in a System on Chip (SoC) component of the apparatus, causing the SoC component to perform a security operation. In other aspects, the first security processor receives a signal via a sensor device sensing environmental conditions surrounding the apparatus and, in response, transmits a security condition signal to the second security processor, causing the SoC component to perform a security operation. The security operation is (Continued)

directly controlled, maintained, and implemented by the second security processor embodied in the SoC component.

20 Claims, 8 Drawing Sheets

(51) Int. Cl.
    *G06F 21/70*     (2013.01)
    *G06F 21/84*     (2013.01)
    *G06F 21/81*     (2013.01)
    *G06F 21/83*     (2013.01)
    *H04W 12/06*     (2009.01)
    *G06F 21/31*     (2013.01)
    *G06F 21/55*     (2013.01)
    *H04L 29/06*     (2006.01)
    *G06F 7/04*     (2006.01)
    *H04W 12/00*     (2009.01)

(52) U.S. Cl.
    CPC ............. *G06F 21/83* (2013.01); *G06F 21/84* (2013.01); *H04L 9/3226* (2013.01); *H04L 63/08* (2013.01); *H04W 12/06* (2013.01); *G06F 2221/2111* (2013.01); *H04W 12/00504* (2019.01)

(58) Field of Classification Search
    CPC ............. G06F 2221/2111; H04L 63/08; H04L 9/3226; H04W 12/06
    See application file for complete search history.

(56) References Cited

U.S. PATENT DOCUMENTS

| | | | | |
|---|---|---|---|---|
| 9,544,419 B2* | 1/2017 | Kozaczuk | ............... | G06F 3/041 |
| 9,654,296 B2* | 5/2017 | Andiappan | ........... | H04L 9/3263 |
| 9,804,659 B2* | 10/2017 | Gu | ........... | G06F 1/324 |
| 2005/0081040 A1* | 4/2005 | Johnson | .................. | G06F 21/32 |
| | | | | 713/176 |
| 2006/0015947 A1* | 1/2006 | Conti | .................. | G06F 12/1433 |
| | | | | 726/34 |
| 2006/0123463 A1* | 6/2006 | Yeap | ........................ | G06F 21/35 |
| | | | | 726/2 |
| 2008/0005561 A1* | 1/2008 | Brown | .................. | G06F 21/305 |
| | | | | 713/164 |
| 2008/0207218 A1* | 8/2008 | Craine | .................. | B60R 25/1004 |
| | | | | 455/456.1 |
| 2008/0272880 A1* | 11/2008 | Sutardja | .................. | G06F 21/76 |
| | | | | 340/5.2 |
| 2010/0083387 A1* | 4/2010 | Rodgers | .................. | G06F 21/81 |
| | | | | 726/36 |
| 2011/0088100 A1* | 4/2011 | Rutman | .................. | G06F 21/10 |
| | | | | 726/28 |
| 2011/0289564 A1* | 11/2011 | Archer | .................... | G06F 21/40 |
| | | | | 726/5 |
| 2012/0146803 A1* | 6/2012 | Gear | .................... | G06F 1/3231 |
| | | | | 340/686.6 |
| 2013/0246800 A1* | 9/2013 | Stewart | ................... | G06F 21/32 |
| | | | | 713/176 |
| 2013/0248717 A1* | 9/2013 | Moore | .................... | G01J 5/02 |
| | | | | 250/341.8 |
| 2014/0164725 A1 | 6/2014 | Jang et al. | | |
| 2014/0343896 A1* | 11/2014 | Le Grand | ........... | G06F 11/3065 |
| | | | | 702/187 |
| 2014/0354406 A1* | 12/2014 | Fyke | ....................... | G06F 21/32 |
| | | | | 340/5.83 |
| 2014/0380403 A1* | 12/2014 | Pearson | .................. | G06F 21/60 |
| | | | | 726/1 |
| 2015/0172539 A1* | 6/2015 | Neglur | ............... | H04N 5/23206 |
| | | | | 348/207.1 |
| 2015/0187206 A1* | 7/2015 | Saurin | .................... | G08C 17/02 |
| | | | | 340/5.61 |
| 2015/0289137 A1 | 10/2015 | Yang et al. | | |
| 2015/0346806 A1* | 12/2015 | Dalal | .................... | G06F 1/3287 |
| | | | | 713/2 |
| 2016/0055102 A1 | 2/2016 | De Cesare et al. | | |
| 2016/0188853 A1* | 6/2016 | Smith | ................... | H04W 12/06 |
| | | | | 726/19 |
| 2017/0064723 A1* | 3/2017 | Armstrong | ............ | H04W 4/021 |
| 2018/0338237 A1* | 11/2018 | Maheswaranathan | .. | H04W 4/90 |

FOREIGN PATENT DOCUMENTS

| | | |
|---|---|---|
| TW | 201408088 | 2/2014 |
| TW | 201629828 | 8/2016 |
| WO | 2009099558 | 8/2009 |
| WO | 2015143066 | 9/2015 |
| WO | 2016105738 | 6/2016 |

OTHER PUBLICATIONS

"Foreign Office Action", TW Application No. 107126610, dated Apr. 8, 2019, 9 pages.

"International Preliminary Report on Patentability", PCT Application No. PCT/US2018/048561, Mar. 19, 2020, 9 pages.

* cited by examiner

CENTRAL AND DELEGATE SECURITY PROCESSORS FOR A COMPUTING DEVICE

BACKGROUND

Today's mobile device user expects the mobile device to not only provide reliable communication, but also to offer security and protection against threats to use of the mobile device, data stored on the mobile device, and operations performed by the mobile device. The threats are many: an unauthorized user, a lost or stolen mobile device, an unintended use of the mobile device (e.g., eavesdropping through a microphone on the mobile device), malware or spyware that may compromise data or applications on the mobile device, or communication from the mobile device to unintended recipients. Each of these may compromise security of the mobile device, a user of the mobile device, or data stored on the mobile device.

Conventional mobile device architecture relies on a System on Chip (SoC) component having memory and multiple processing cores to operate the mobile device. Security against threats to the mobile device typically relies upon functionality provided by a single secure element separate and disparate from the SoC component, such as a Trusted Platform Module (TPM) component or a discrete Secure Element (SE) component. The TPM/SE component can, for example, receive signals and, based on the signals, perform security operations directed to authentication services, such as authenticating passwords, encryption keys, or certificates in order to protect data stored on the mobile device. The use of the TPM/SE component, however, has limitations with regards to directly operating or controlling the mobile device. If, for example, the TPM/SE component itself is consumed performing an authentication security operation or if the TPM/SE component itself is compromised, a security operation direct to enabling or curtailing mobile device functionality may not be executable.

SUMMARY

This summary is provided to introduce subject matter that is further described in the Detailed Description and Drawings. Accordingly, this Summary should not be considered to describe essential features nor used to limit the scope of the claimed subject matter.

In some aspects, an apparatus is described that comprises a central security processor device embodied in a Central Security Chip (CSC) component, a delegate security processor device embodied in a System on Chip (SoC) component, and a user input subsystem. The central security processor device is configured to receive an input signal from a user via the user input subsystem, determine a security condition, and, in response to determining the security condition, transmit a security condition signal to the delegate security processor device. The delegate security processor device is configured to receive the signal and, in response to receiving the signal, cause the SoC component to perform a security operation.

In some aspects, an apparatus is described that comprises a central security processor device embodied in a CSC component, a delegate security processor device embodied in a SoC component, and a sensor subsystem. The central security processor device is configured to receive a sensed signal from the sensor subsystem, determine a security condition, and, in response to determining the security condition, transmit a security condition signal to the delegate security processor device. The delegate security processor device is configured to receive the signal and, in response to receiving the signal, cause the SoC component to perform a security operation.

In other aspects, a method performed by an apparatus is described where a delegate processor device embodied in a SoC component receives a security condition signal. The security condition signal is from a central security processor embodied in a CSC component that is separate and disparate from the SoC component and sent by the central security processor device in response to the central security processor device receiving a sensed or input signal. The delegate security processor device then causes, in response to receiving the security condition signal, the SoC component to perform a security operation.

The details of one or more implementations are set forth in the accompanying drawings and the following description. Other features and advantages will be apparent from the description and drawings, and from the claims.

BRIEF DESCRIPTION OF THE DRAWINGS

The details of one or more aspects of central and delegate security processors for an electronic computing device are described below. The use of the same reference numbers in different instances in the description and the figures may indicate like elements.

DETAILED DESCRIPTION

Conventional architecture of a mobile device relies on a System on Chip (SoC) component having integrated circuits (IC's) comprised of memory and multiple processing core devices necessary to operate the mobile device. Security against threats to a mobile device typically relies upon services provided by a single secure element such as a Trusted Platform Module (TPM) component or a discrete Secure Element (SE) component having additional IC circuitry. Such components can, for example, receive signals and, based on the signals, perform authentication services such as authenticating passwords, encryption keys, or certificates in order to protect data stored on the mobile device. For the mobile device to pass a security assurance certification such as an Evaluation Assurance Level (EAL) category ranking, it is often necessary for the TPM/SE component to be separate and disparate from other components of the mobile device, including the SoC component. In addition, IC circuitry that is included as part of the TPM/SE component and is necessary for the TPM/SE component to function, particularly IC circuitry centric to a TPM/SE specific memory device, may not be capable of being manufactured as part of the SoC component due to limitations of the SoC manufacturing technology; this further necessitates that the TPM/SE component with the TPM/SE specific memory device be separate and disparate from the SoC component.

In particular, the TPM/SE component is passive with regards to controlling operation of the mobile device. If a security condition develops, the TPM/SE component cannot directly enable or disable subsystems of the mobile device that might be used to perform, for example, user input functions, sensing functions, power management functions, memory management functions, or communication system functions. In such an instance, architecture utilizing the SoC to maintain direct control over the enabling or disabling of subsystems of the mobile device is needed.

A security policy typically defines protocol that is to be used when enabling or disabling subsystems of a mobile device when the mobile device experiences a security condition. Such a security policy may be developed by a user of the mobile device and vary based on a variety of factors, including, for example, a particular user of the mobile device, a particular security condition, or a particular mobile device itself.

This disclosure describes apparatuses and methods for maintaining security of a mobile device according to a security policy, utilizing a central security processor device embodied in a Central Security Chip (CSC) component and a delegate security processor device embodied in a SoC component. The central security processor device determines, based on a received signal and data stored in a memory device that is also embodied in the CSC, a security condition. In order to maintain security of the mobile device according to a particular security policy, the central security processor device then transmits a signal, via a secure control and communication network, to the delegate security processor device. The delegate security processor device then causes the SoC component to perform the security operation, relying on one or more subsystem processing cores embodied in the SoC component to execute the security operation.

The following discussion describes an operating environment, apparatuses in which components of the operating environment can be embodied, and a method that may be employed in the operating environment. In the context of the present disclosure, reference is made to the operating environment by way of example only.

Operating Environment

Figure 1:
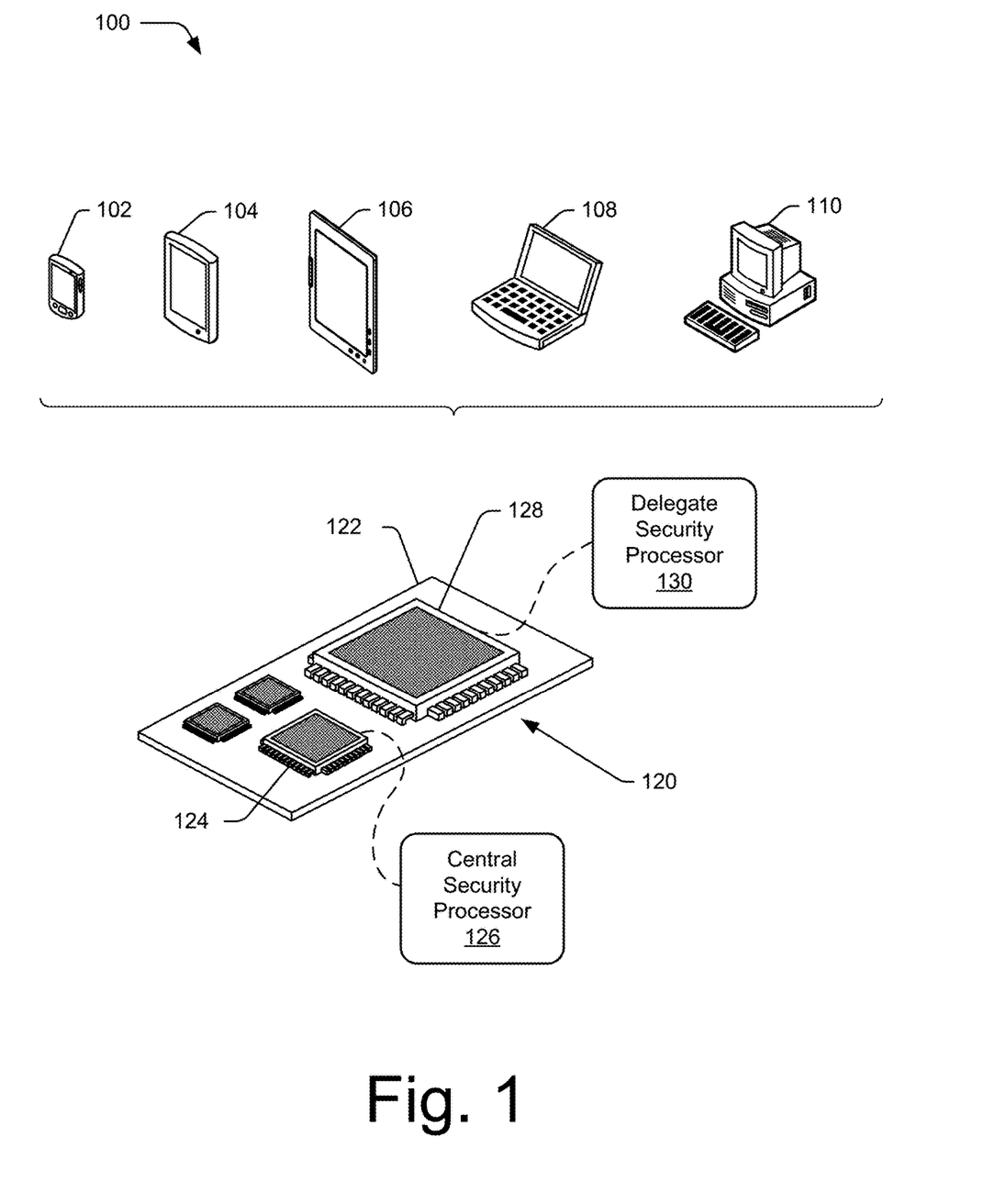
FIG. 1 illustrates an example operating environment that includes a variety of electronic computing devices built in accordance with one or more aspects.

FIG. 1 illustrates an example operating environment 100 that includes a variety of electronic computing devices in accordance with one or more aspects. The variety of electronic computing devices includes mobile computing devices such as a mobile phone 102, a personal digital assistant 104, a tablet 106, and a laptop 108 computer. The operating environment may also include non-mobile computing devices such as the personal computer 110 and the like.

Generally, the variety of electronic computing devices will each include at least one printed circuit board (PCB) module 120 populated with a variety of components, IC-based or otherwise. In this example, the PCB module includes a printed circuit board 122 includes one or more layers of dielectric and conductive circuitry, a Central Security Chip (CSC) component 124 having a central security processor device 126 and a System on Chip (SoC) component 128 having a delegate security processor device 130.

In the context of the operating environment 100, an electronic computing device may perform any number of sensitive operations that access, exchange, display, or record sensitive data. The access, exchange, display, or recording of sensitive data may be a component of, for example, performing a financial transaction, initiating a function of a physical device that is part of the Internet of Things (IoT), or controlling automobile operation via an Advanced Driver-Assistance System (ADAS). The sensitive operation may be performed via the electronic computing device communicating to another electronic computing device either directly or indirectly via any one of a variety of networks, including a local area network (LAN), a wide area network (WAN), a wireless local area network (WLAN), and the like. Communicating via the variety of networks may be supported by any number of communication technologies, including Wi-Fi, Bluetooth, fiber-optics, or infrared communication. As a sensitive operation is being performed by the electronic computing device, it is desirable to assure that a security condition compromising secure operation of the electronic computing device is not present. Such a security condition may be, for example, access of the electronic computing device by an unintended user (either directly or remotely) or the electronic computing device being in an environment where it is not intended to be used. In the context of the operating environment 100, the central security processor device 126 embodied in the CSC component 124 is used to determine such a security condition exists and, in response, transmit a security condition signal to the delegate security processor device 130 embodied in the SoC component 128 such that it can, in response, perform a security operation that directly enables or disables any number of subsystems of the electronic computing device. A particular security operation to be performed may be established via a security policy that is implemented by a user of the electronic computing device.

Figure 2:
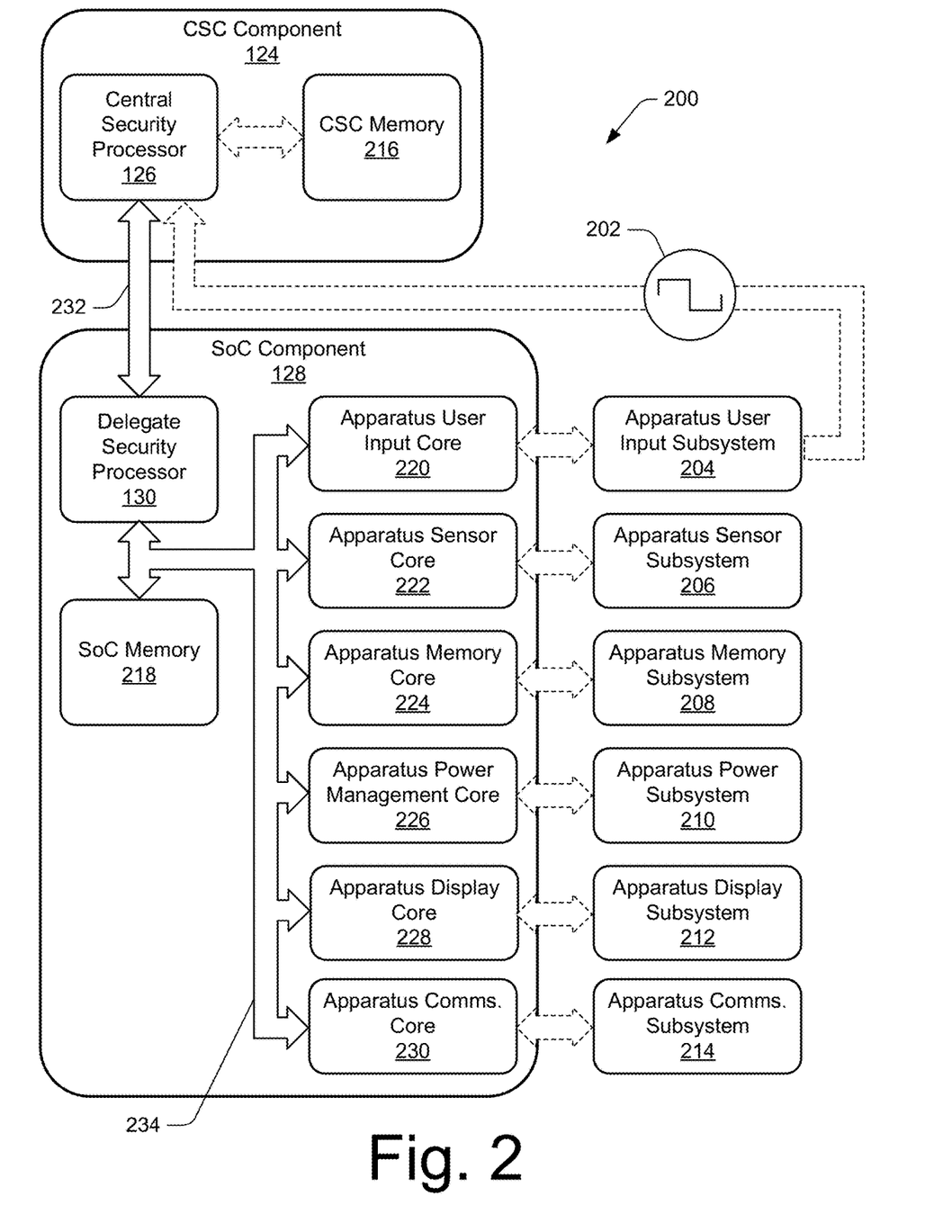
FIG. 2 illustrates an example apparatus having a configuration where an input signal is sent to a CSC component, which then processes the input signal and communicates to a SoC component in accordance with one or more aspects.

FIG. 2 illustrates an example apparatus having a configuration 200 where an input signal 202 is sent to a central security processor device 126 embodied in a CSC component 124 of the apparatus. The central security processor device 126 is configured to communicate with a delegate security processor device 130 embodied on a SoC component 128 of the apparatus. The SoC component 128 is separate from the CSC component 124 in accordance with operating environment 100 and as determined by Evaluation Assurance Level requirements. The apparatus further comprises multiple apparatus subsystems, including an apparatus user input subsystem 204, an apparatus sensor subsystem 206, an apparatus memory subsystem 208, an apparatus power subsystem 210, an apparatus display subsystem 212, and an apparatus communications subsystem 214.

The CSC component 124 also includes IC circuitry comprising a CSC component memory device 216 storing data. The central security processor device 126 is configured to, upon receipt of the input signal 202, determine whether a security condition exists based on the received input signal 202 and the data stored in the CSC component memory device 216. If the security condition exists, the central security processor device 126 transmits a security condition signal to the delegate security processor device 130.

The SoC component 128 also includes IC circuitry comprising a SoC component memory device 218. The SoC component memory device 218 is a computer-readable memory device storing instructions that, when executed, cause the central security processor device 126 to perform a security operation in response to receiving the security condition signal. The SoC component 128 also comprises IC circuitry of multiple apparatus subsystem core devices used for processing other instructions that are stored in the SoC component memory device 218 and that also control operations of the apparatus, including operations performed by an apparatus user input core device 220, an apparatus sensor core device 222, an apparatus memory core device 224, an apparatus power management core device 226, an apparatus display core device 228 and an apparatus communications core device 230. Apparatus subsystem core devices 220-230 may communicate with corresponding apparatus subsystems 204-214 in order to operate the corresponding subsystems.

Communication within the apparatus is configured such that the central security processor device 126 and the delegate security processor device 130 communicate via an external secure control and communication bus 232, where the external secure control and communication bus 232 is external to both the CSC component 124 and the SoC component 128. The delegate security processor device 130, the SoC component memory device 218, and the apparatus subsystem core devices 220-230 communicate via an internal secure control and communication bus 234 that is internal the SoC component 128.

In the instance where the central security processor device 126 receives the input signal 202, determines a security condition, and transmits a security condition signal to the delegate security processor device 130, the delegate security processor device 130 may according to a security policy and in a fashion autonomous from the central security processor device 126, communicate messaging to the apparatus subsystem core devices 220-230 which, in turn, signal the apparatus subsystems 204- 214 to perform one or more security operations according to the security policy.

The security operations may include security operations directed to functionality of the apparatus including, for example, disabling a display of the apparatus so that information cannot be displayed, powering off the apparatus so that an unintended user may not be able to use the device, shutting down a data path to a memory device of the apparatus so that confidential information cannot be accessed, disabling a sensor device of the apparatus so that the apparatus is unable to record visual or audible conditions surrounding the apparatus, or disabling communications of the apparatus in order to prevent unintended transmission or receipt of information by the apparatus. The delegate security processor device 130 might also perform security operations that are directed to data security and authentication and might otherwise be performed by the central security processor device 126, such as such as template matching, keymaster, or encryption security operations.

Figure 3:
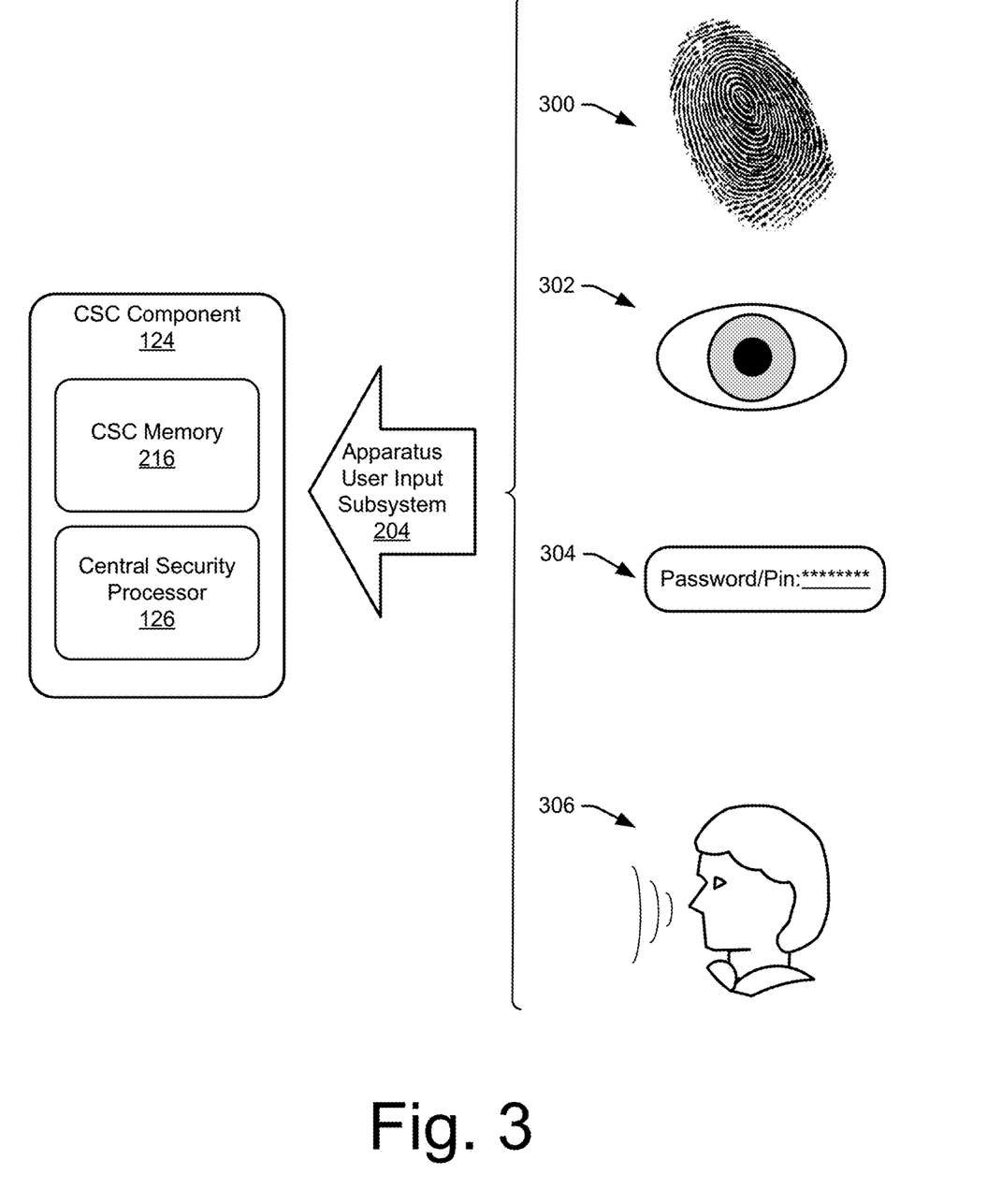
FIG. 3 illustrates example user inputs that are signaled to a central security processor device in accordance with one or more aspects.

FIG. 3 illustrates example user inputs that are signaled to the central security processor device 126 in accordance with operating environment 100. User inputs are input via a user input subsystem 204, which may include a keypad, a microphone, scanner, image capture device, or the like. User inputs may include, for example, a fingerprint 300, an iris pattern 302, or password or personal identification number 304. User inputs may also include a vocal command 306 that is sufficient for voice recognition. Such user inputs may be used by the central security processor device 126 to determine, for example and based on data stored in the CSC memory device 216, one or more security conditions related to authenticating a user of the apparatus.

Additionally or alternatively, the user input subsystem 204 may provide an input signal to the central security processor device 126 in a passive fashion. For example, a microphone or image capture device of the user input subsystem may passively monitor surroundings and users near the device and, without direct, active input from a user, transmit an input signal to the central security processor device 126. The central security processor device 126 may then determine a security condition exists, and accordingly, transmit a security condition signal to the central security processor device 126.

Figure 4:
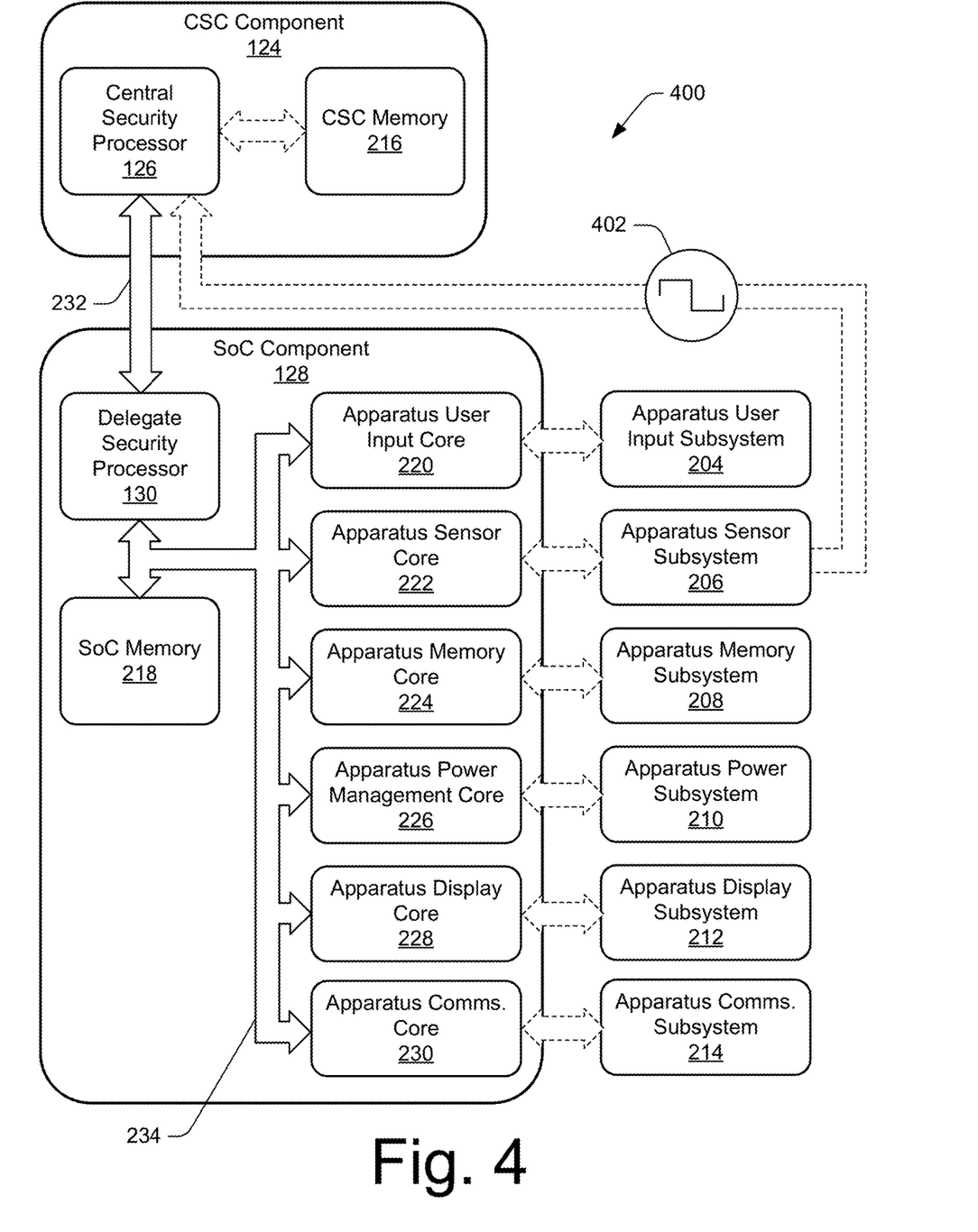
FIG. 4 illustrates an example apparatus having a configuration where a sensed signal is sent to a CSC component, which then processes the sensed signal and communicates to a SoC component in accordance with one or more aspects.

FIG. 4 illustrates an example apparatus having a configuration 400 where a sensed signal 402 is sent to a central security processor device 126 embodied in a CSC component 124 of the apparatus. The central security processor device 126 is configured to communicate with a delegate security processor device 130 embodied on a SoC component 128 of the apparatus. The SoC component 128 is separate from the CSC component 124 in accordance with operating environment 100 and as determined by Evaluation Assurance Level requirements. The apparatus further comprises multiple apparatus subsystems, including an apparatus user input subsystem 204, an apparatus sensor subsystem 206, an apparatus memory subsystem 208, an apparatus power subsystem 210, an apparatus display subsystem 212, and an apparatus communications subsystem 214.

The CSC component 124 also includes IC circuitry comprising a CSC component memory device 216 storing data. Upon receipt of the input signal 202, the central security processor device 126 is configured to determine whether a security condition exists based on the received input signal 202 and the data stored in the CSC component memory device 216. If the security condition exists, the central security processor device 126 transmits a security condition signal to the delegate security processor device 130.

The SoC component 128 also includes IC circuitry comprising a SoC component memory device 218. The SoC component memory device 218 is a computer-readable memory device storing instructions that, when executed, cause the central security processor device 126 to perform a security operation in response to receiving the security condition signal. The SoC component 128 also comprises IC circuitry of multiple apparatus subsystem core devices used for processing other instructions that are stored in the SoC component memory device 218 and that also control operations of the apparatus, including operations performed by an apparatus user input core device 220, an apparatus sensor core device 222, an apparatus memory core device 224, an apparatus power management core device 226, an apparatus display core device 228 and an apparatus communications core device 230. Apparatus subsystem core devices 220-230 may communicate with corresponding apparatus subsystems 204-214 in order to operate the corresponding subsystems.

Communication within the apparatus is configured such that the central security processor device 126 and the delegate security processor device 130 communicate via an external secure control and communication bus 232, where the external secure control and communication bus 232 is external to both the CSC component 124 and the SoC component 128. The delegate security processor device 130, the SoC component memory device 218, and the apparatus subsystem core devices 220-230 communicate via an internal secure control and communication bus 234, which is internal the SoC component 128.

In the instance where the central security processor device 126 receives the sensed signal 402, determines a security condition, and transmits a security condition signal to the delegate security processor device 130, the delegate security processor device 130 may, according to a security policy and in a fashion autonomous from the central security processor device 126, communicate messaging to the apparatus subsystem core devices 220-230 which, in turn, signal the apparatus subsystems 204-214 to perform one or more security operations according to the security policy.

The security operations may include security operations directed to functionality of the apparatus including, for example, disabling a display of the apparatus so that information cannot be displayed, powering off the apparatus so that an unintended user may not be able to use the device, shutting down a data path to a memory device of the apparatus so that confidential information cannot be accessed, disabling a sensor device of the apparatus so that the apparatus is unable to record visual or audible conditions surrounding the apparatus, or disabling communications of the apparatus in order to prevent unintended transmission or receipt of information by the apparatus.

The delegate security processor device 130 may also perform security operations that are directed to data security and authentication and might otherwise be performed by the central security processor device 126, such as such as template matching, keymaster, or encryption security operations.

Figure 5:
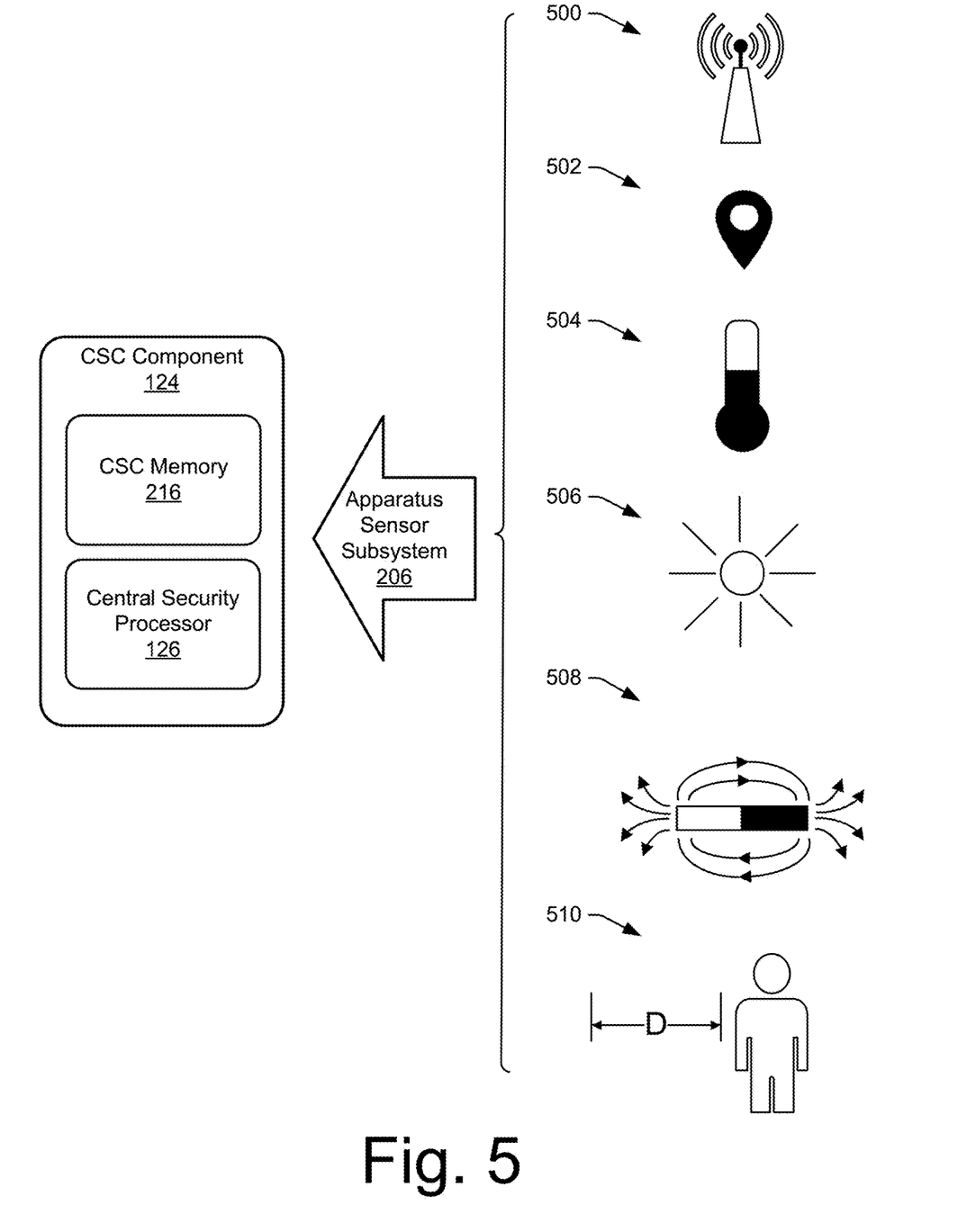
FIG. 5 illustrates example sensed environmental conditions that are sensed by a sensor subsystem and signaled to a central security processor device in accordance with one or more aspects.

FIG. 5 illustrates example sensed environmental conditions, which are sensed by a sensor subsystem and signaled to the central security processor device 126 in accordance with one or more aspects of operating environment 100. Surroundings of the apparatus that indicate environmental conditions are sensed by the apparatus sensor subsystem 206 which may be comprised of any combination of sensor devices that, for example, sense radio waves 500 used in communication or radar technologies, position signals 502 used for location or Global Positioning Systems (GPS), thermal conditions 504 surrounding the apparatus, light waves 506 that may be surrounding or communicating with the apparatus, electromagnetic flux 508 that may be surrounding the apparatus, or a proximity signal 510 indicating proximity of the apparatus to a user.

A sensed single environmental condition or a sensed combination of environmental conditions may be used by the central security processor device 126 to determine a security condition where the apparatus is being accessed by another apparatus which is not authorized to retrieve data from the apparatus, a security condition where the apparatus has been stolen or transported to a location where it is not to operate, a security condition where operating the apparatus may damage the apparatus, or a security condition where the apparatus is not in proximity to the owner of the apparatus. Such sensed conditions be used by the central security processor device 126 to determine, for example and based on data stored in the CSC memory device 216, one or more security conditions related to the apparatus's presence in an insecure environment.

Figure 6:
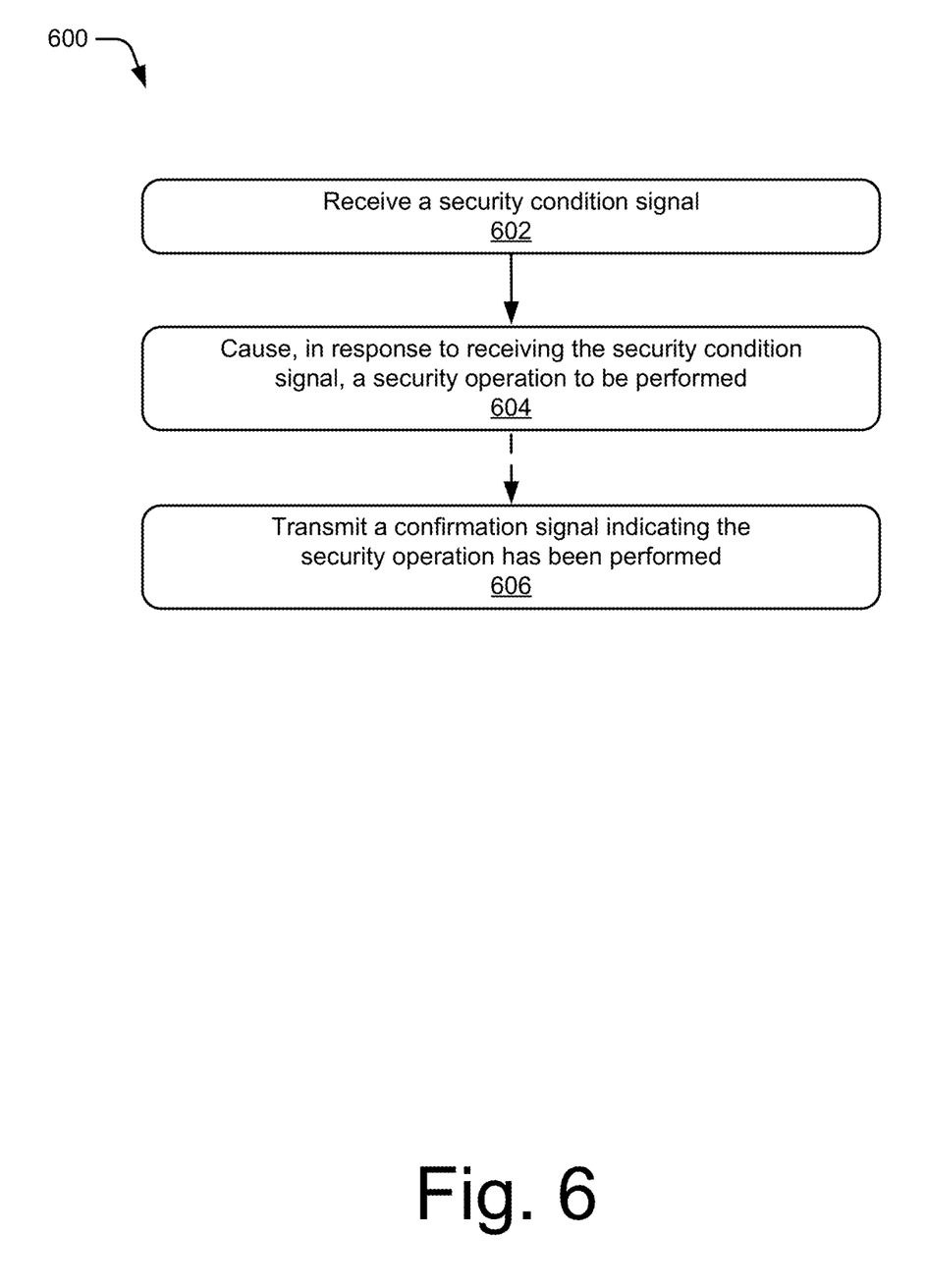
FIG. 6 illustrates an example method performed by a delegate security processor device of an apparatus in accordance with one or more aspects.

FIG. 6 illustrates an example method 600 performed by a delegate security processor device of an apparatus. The delegate security processor device 130 may be embodied on the SoC component 128 as describe above. At stage 602, the delegate security processor device receives a security condition signal. At stage 604, the delegate security processor device causes, in response to receiving the security condition signal, a security operation to be performed. The security operation may be a security operation that is directed to functionality of the apparatus including, for example, disabling a display of the apparatus so that information cannot be displayed, powering off the apparatus so that an unintended user may not be able to use the device, shutting down a data path to a memory device of the apparatus so that confidential information cannot be accessed, disabling a sensor device of the apparatus so that the apparatus is unable to record visual or audible conditions surrounding the apparatus, or disabling communications of the apparatus in order to prevent unintended transmission or receipt of information by the apparatus. The security operation may alternatively be a security operation that is directed to data security and authentication, such as performing a template matching operation, performing a keymaster operation, or performing an encryption operation. At stage 606, the delegate security processor device optionally transmits a confirmation signal indicating confirming that the security operation has been performed.

Figure 7:
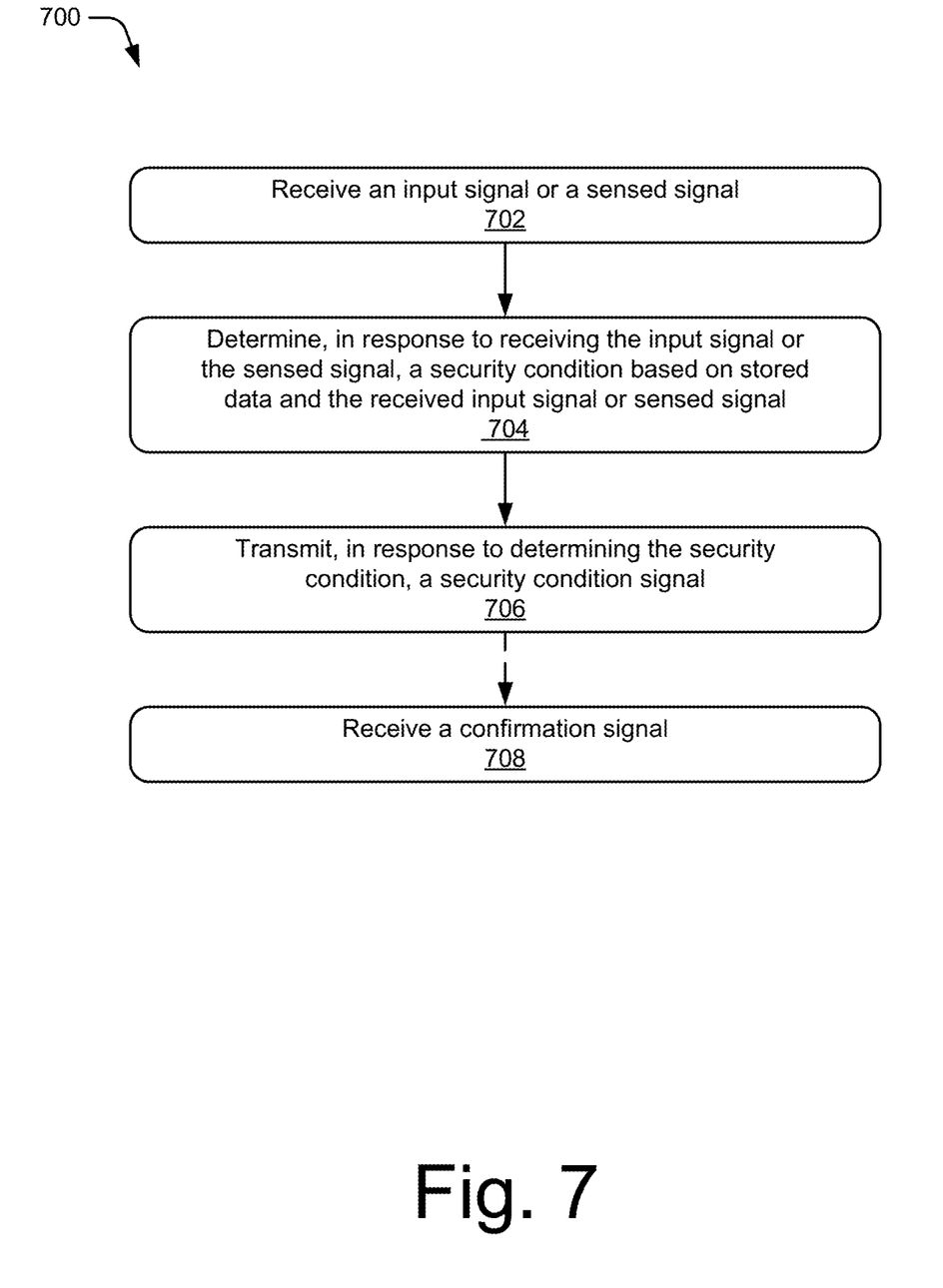
FIG. 7 illustrates an example method performed by a central security processor device of an apparatus in accordance with one or more aspects.

FIG. 7 illustrates an example method 700 performed by a central security processor device of an apparatus. The central security processor device may be embodied on the CSC component 124 as described above. At stage 702, the central security processor device receives an input signal or a sensed signal. In some cases, the input signal may be received from a user input subsystem of the apparatus, and may be an iris pattern, a password, a personal identification number, or a vocal command. In other cases, the sensed signal may be received from a sensor subsystem of the apparatus that senses a radio wave, a position, a thermal condition, a light wave, an electromagnetic flux, or a proximity of the apparatus to a user. At stage 704, the central security processor device determines, based on stored data and the received input signal or sensed signal, a security condition. At stage 706 the central security processor device transmits, in response to determining the security condition, a security condition signal. At stage 708 the central security processor device optionally receives a confirmation signal that confirms a security operation has been performed.

Figure 8:
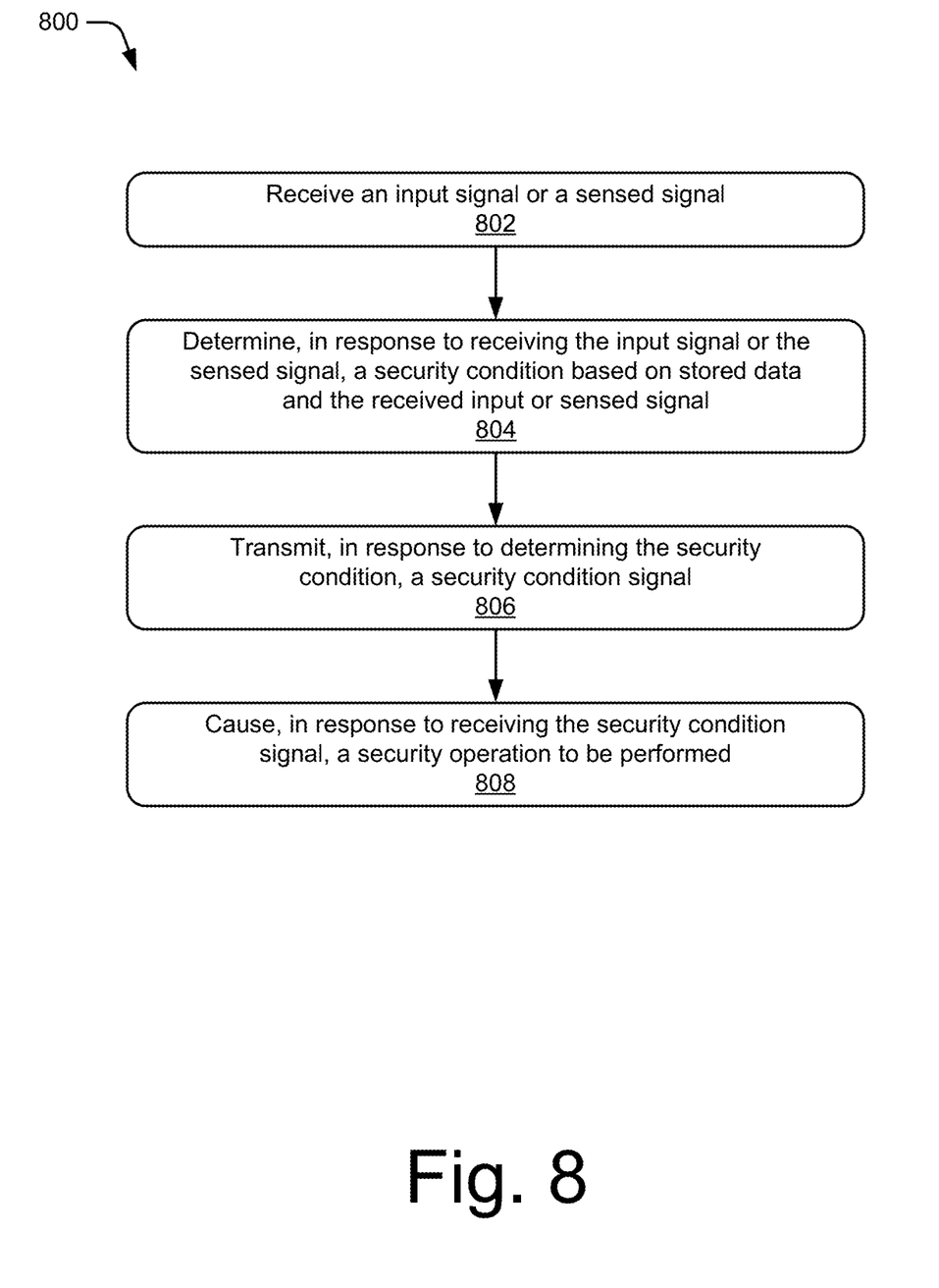
FIG. 8 illustrates an example method performed on an apparatus having a central security processor device and a delegate security processor device in accordance with one or more aspects.

FIG. 8 illustrates an example method 800 performed on an apparatus having a central security processor device and a delegate security processor device. The central security processor device may be embodied on the CSC component 124 as described above. The delegate security processor device may be embodied on the SoC component 128 as described above.

At stage 802, the central security processor device receives a signal. In some cases, the signal may be received from a user input subsystem of the apparatus, and may be an iris pattern, a password, a personal identification number, or a vocal command. In other cases, the signal may be received from a sensor subsystem of the apparatus that senses a radio wave, a position, a thermal condition, a light wave, an electromagnetic flux, or a proximity of the apparatus to a user.

At stage 804, the central security processor device determines a security condition in response to receiving the signal and based, at least in part, on data stored on the CSC component. The central security processor device then transmits, in response to determining the security condition, a security condition signal to the delegate security processor device.

At stage 806, the delegate security processor device causes the SoC to perform a security operation in response to receiving the security condition signal. The security operation may be a security operation that is directed to functionality of the apparatus including, for example, disabling a display of the apparatus so that information cannot be displayed, powering off the apparatus so that an unintended user may not be able to use the device, shutting down a data path to a memory device of the apparatus so that confidential information cannot be accessed, disabling a sensor device of the apparatus so that the apparatus is unable to record visual or audible conditions surrounding the apparatus, or disabling communications of the apparatus in order to prevent unintended transmission or receipt of information by the apparatus. The security operation may alternatively be a security operation that is directed to data security and authentication, such as performing a template matching operation, performing a keymaster operation, or performing an encryption operation.

CONCLUSION

Although techniques using, and apparatuses including, a CSC component having a central security processor device and a SoC component having a delegate security processor device are described, it is to be understood that the subject of the appended claims is not necessarily limited to the specific features or methods described. Rather, the specific features and methods are disclosed as example ways in a central security processor device and a delegate security processor device can be implemented.

What is claimed is:

1. An apparatus comprising:
a user input subsystem configured to receive an input from a user;
a security component, the security component having a first security processor device configured to:
receive an input signal from the user and via the user input subsystem;
determine a security condition based on the input signal received from the user input subsystem; and
transmit, in response to determining the security condition, a security condition signal; and
a System on Chip (SoC) component separate from the security component, the SoC component having multiple subsystem core devices and a second security processor device, the second security processor device configured to:
receive, from the first security processor device, the security condition signal; and
communicate, in response to receiving the security condition signal and autonomously from the first security processor device via a secure control and communication bus that is internal to the SoC component, messaging to at least one of the multiple subsystem core devices, the messaging directing the at least one subsystem core device to perform a security operation that disables a corresponding subsystem.

2. The apparatus as recited by claim 1, further comprising an external secure control and communication bus, the external secure control and communication bus configured to transmit the security condition signal from the first security processor device to the second security processor device.

3. The apparatus as recited by claim 1, wherein the first security processor device configured to determine the security condition determines the security condition based on data stored on the security component.

4. The apparatus as recited by claim 1, wherein the first security processor device configured to receive the input signal from the user input subsystem receives a signal generated by the user input subsystem in response to the user input subsystem receiving a personal identification number or a password.

5. The apparatus as recited by claim 1, wherein the security operation disables a display of the apparatus.

6. The apparatus as recited by claim 1, wherein the security operation disables a memory subsystem by shutting down a data path to a memory device of the apparatus.

7. The apparatus as recited by claim 1, wherein security operation disables a communications subsystem of the apparatus so that the apparatus is unable to record visual or audible conditions surrounding the apparatus.

8. The apparatus as recited by claim 1, wherein a security policy that is implemented by a user of the apparatus establishes the security operation that disables the corresponding subsystem of the apparatus.

9. An apparatus comprising:
a sensor subsystem configured to sense an environmental condition;
a security component, the security component having a first security processor device configured to:
receive a sensed signal from the sensor subsystem;
determine a security condition based on the sensed signal received from the sensor subsystem; and
transmit, in response to determining the security condition, a security condition signal; and
a System on Chip (SoC) component separate from the security component, the SoC component having multiple subsystem core devices and a second security processor device, the second security processor device configured to:
receive, from the first security processor device, the security condition signal; and
communicate, in response to receiving the security condition signal and autonomously from the first security processor device via a secure control and communication bus that is internal to the SoC component, messaging to at least one of the multiple subsystem core devices, the messaging directing the at least one subsystem core device to perform a security operation that disables a corresponding subsystem.

10. The apparatus as recited by claim 9, further comprising an external secure control and communication bus, the external secure control and communication bus configured to transmit the security condition signal from the first security processor device to the second security processor device.

11. The apparatus as recited by claim 9 wherein the first security processor device configured to determine the security condition determines the security condition based on data stored on the security component.

12. The apparatus as recited by claim 9, wherein the first security processor device configured to receive a sensed signal from the sensor subsystem receives a signal generated by the sensor subsystem in response to the sensor subsystem sensing a radio wave used for radar.

13. The apparatus as recited by claim 9, wherein the security operation disables a display of the apparatus.

14. The apparatus as recited by claim 9, wherein the security operation disables a memory subsystem by shutting down a data path to a memory device of the apparatus.

15. The apparatus as recited by claim 9, wherein security operation disables a sensor device of the apparatus.

16. The apparatus as recited by claim 9, wherein the sensor subsystem includes a proximity sensor and the sensed signal is a proximity signal that indicates a proximity of the apparatus to an owner of the apparatus.

17. The apparatus as recited by claim 9, wherein the sensor subsystem includes an image capture device that passively monitors the environment and the sensed signal is a signal from the image capture device that indicates a user other than the owner of the apparatus.

18. The apparatus as recited by claim 9, wherein the sensor subsystem includes a light sensor that senses a light wave used for communicating with the apparatus.

19. A method performed by an apparatus, the method comprising:
  receiving, by a first security processor device embodied in a System on Chip (SoC) component having multiple subsystem core devices, a security condition signal, the security condition signal sent by a second security processor device embodied in a security component that is separate from the SoC component and sent in response to the second security processor device receiving a sensed signal or an input signal;
  communicating, in response to receiving the security condition signal and autonomously from the second security processor device via a secure control and communication bus that is internal to the SoC component, messaging to at least one of the multiple subsystem core devices, the messaging directing the at least one subsystem core device to perform a security operation that disables a corresponding subsystem; and
  transmitting, by the first security processor device in response to the at least one subsystem core device performing the security operation, a confirmation signal to the second security processor device.

20. The method as recited by claim 19, wherein the sensed signal or input signal received by the second security processor device is:
  an input that is input by a user of the apparatus; or
  an indication of an environmental condition that is sensed by a sensor subsystem of the apparatus.

* * * * *

UNITED STATES PATENT AND TRADEMARK OFFICE
CERTIFICATE OF CORRECTION

PATENT NO. : 10,740,494 B2  
APPLICATION NO. : 15/697059  
DATED : August 11, 2020  
INVENTOR(S) : Osman Koyuncu, William A. Drewry and Xiaowen Xin Page 1 of 1

It is certified that error appears in the above-identified patent and that said Letters Patent is hereby corrected as shown below:

In the Claims

Column 10 Lines 16-17 please delete "subsystem of the apparatus." insert --subsystem.--

Signed and Sealed this  
Twenty-second Day of September, 2020

Andrei Iancu  
*Director of the United States Patent and Trademark Office*